Figure 1:
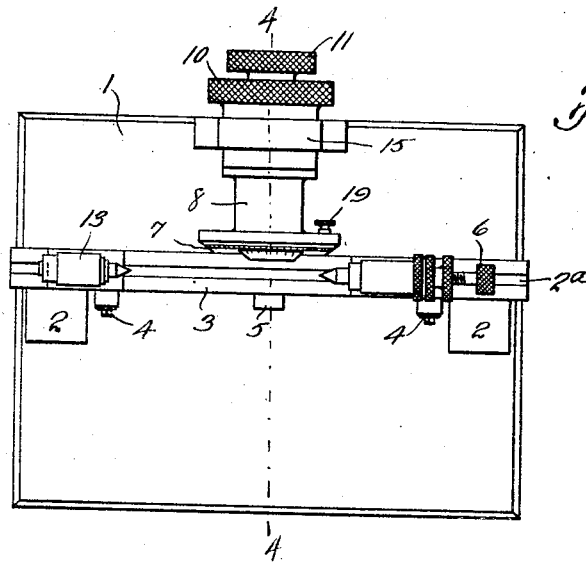

C. LOEFFLER.
SINE BAR FIXTURE.
APPLICATION FILED JAN. 24, 1920.

1,366,396.

Patented Jan. 25, 1921.
2 SHEETS—SHEET 1.

Inventor
Christian Loeffler
By
Attorney

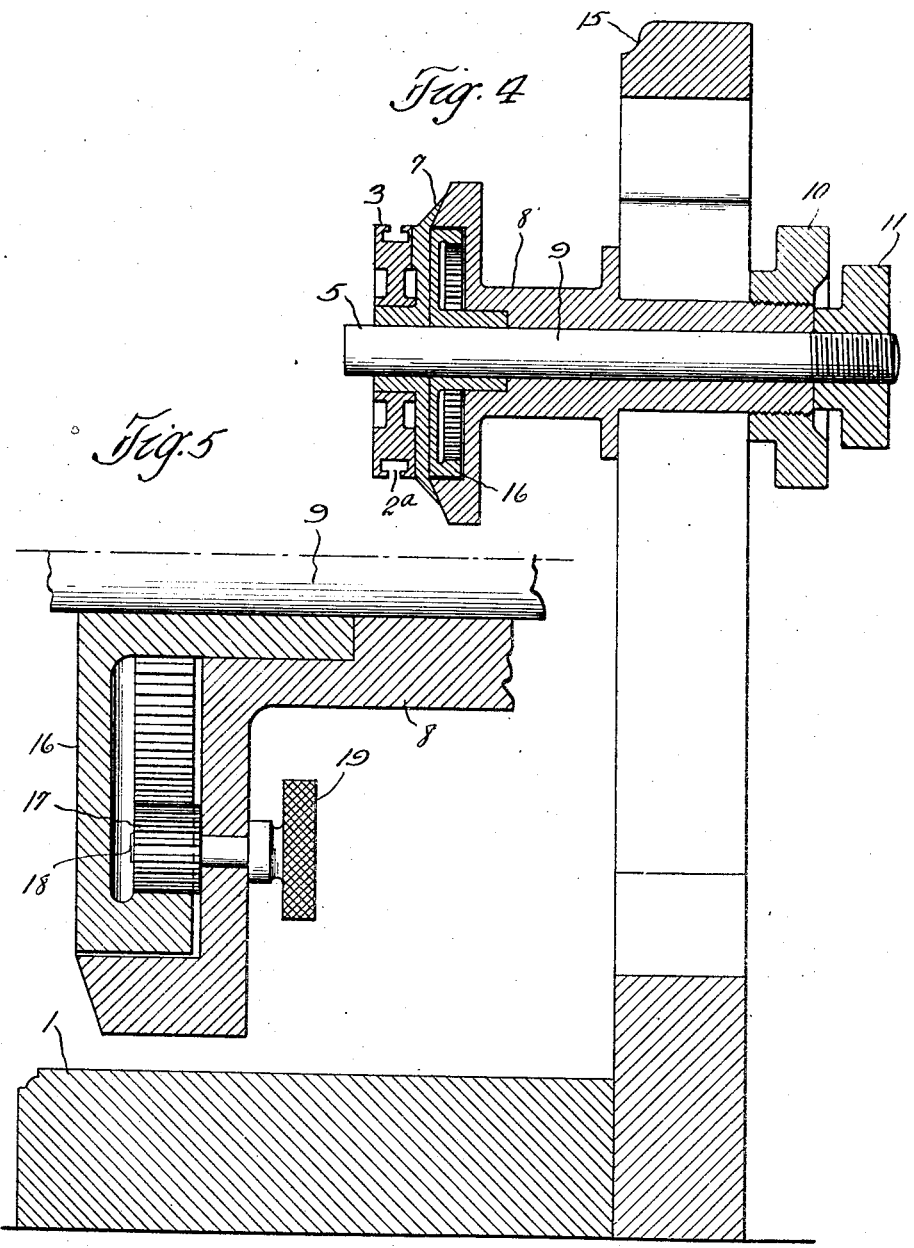

UNITED STATES PATENT OFFICE.

CHRISTIAN LOEFFLER, OF DETROIT, MICHIGAN, ASSIGNOR TO BLODGETT ENGINEERING AND TOOL COMPANY, OF DETROIT, MICHIGAN, A CORPORATION OF MICHIGAN.

SINE-BAR FIXTURE.

1,366,396.  Specification of Letters Patent.  Patented Jan. 25, 1921.

Application filed January 24, 1920. Serial No. 353,893.

*To all whom it may concern:*

Be it known that I, CHRISTIAN LOEFFLER, a subject of the Government of Germany, and residing at Detroit, in the county of Wayne and State of Michigan, have invented certain new and useful Improvements in Sine-Bar Fixtures, of which the following is a specification.

This invention relates to what is generally termed a sine bar testing instrument, used in inspection rooms of machine tool manufacturing establishments and elsewhere.

A sine bar as usually constructed, consists essentially of a flat horizontal plate, known to the art as a surface plate, in connection with a swiveled work holding attachment conveniently mounted above the surface plate. The work in its holding or clamping means is free for movement in a single vertical plane. Usually the bar on which the work rests is free to rotate about a fixed pivot at one end of the bar. An accurately ground round projection, or what is known as a button by the machine tool worker, is attached at opposite end.

The button is permanently placed a constant distance from the pivot center, and this distance is considered as the hypotenuse of a triangle, and the amount of taper or the angle of the surface of the work or the bar is found by determining the distance of the center of the button at its free end from the surface plate, subtracting therefrom the known distance from the surface plate to the center of the pivot, this distance corresponding to a second side of the triangle and termed the sine of the angle.

The relation between the measured sine and the predetermined fixed center distance between the fixed end pivot and the button at the opposite end of bar, determines the angle of the machined surface of the work. These operations are well known to those skilled in the art.

In my improved sine bar fixture I have embodied several features which to the best of my knowledge and belief, have never before been used in instruments of this class.

In my device I place on the bar two adjustable buttons and pivot the bar between the buttons approximately at the middle of the bar. The usual means of adjustment vertically of the pivot in the stand are provided. By placing the pivot in the center of bar instead of at the end, I obtain a much better balance of the work and lessen the danger of slipping at the pivot during testing, also better allowing the introduction of angle-measuring washers or protractor disks at the pivot without appreciably placing strain on the washers or relying on the frictional coefficient of protractor washers to retain the accurate setting of the work.

Another improvement in my device is the placing of suitable T slots on the top as well as on the bottom of the bar, so as to allow of placing a live and a dead center for holding round ground or turned work, also to allow for placing arms extending from under side of bar upon which to place flat work to undergo test or inspection. The use of the centers on the bar allows of suitably holding straight, round or taper round work and spinning the work while under test to determine perfect roundness of the work under the ordinary test indicator on a stand placed on the surface plate base.

In testing angles to which taper work is machined the top surface may be brought to a horizontal position and checked by the ordinary test indicator on a stand usually employed for such purposes. The approximate angle of the surface with the center of the work will be indicated in the protractor at the pivot, twice this angle being the included angle between the top and bottom of the work. By measuring accurately the difference between the heights above the surface plate of the two indicator button centers the sine is determined. A standard form of height gage will be used for the purpose. The distance between the buttons, I prefer to make 10″, and the relation between the sine and hypotenuse is determined immediately by moving the decimal point one place, and by referring to standard table of sines, the angle is determined; and knowing the angle or only the sine measurement, a table of tapers per foot may be prepared and used.

Figure 2:
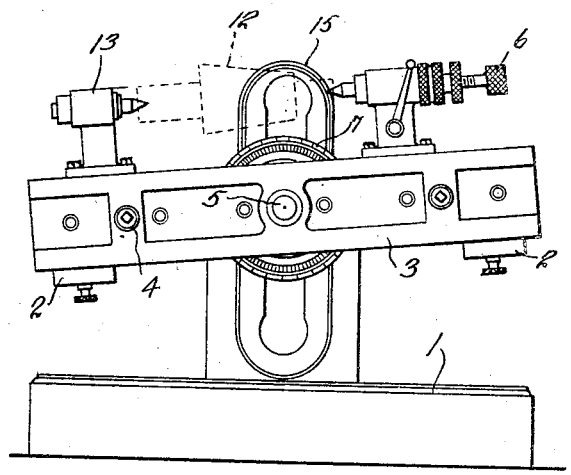
Figure 3:
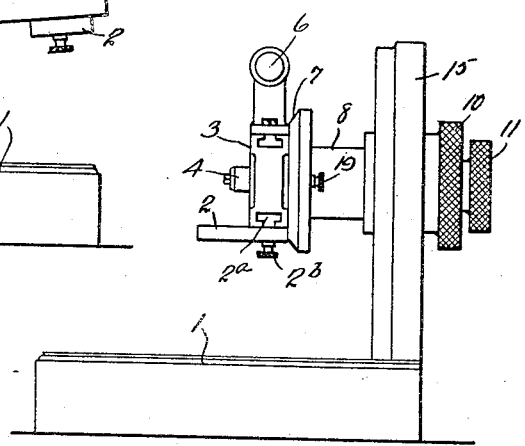

In the accompanying drawings Figure 1 is a plan of the instrument. Fig. 2 is a front elevation. Fig. 3 is an end elevation. Fig. 4 is a section on the line 4—4 of Fig. 1. Fig. 5 is an enlarged detail in section.

In the drawings herewith, 1 is the base, the top of which is very accurately machined and ground to form the surface plate.

2 represents arms extending from the side of bar 3 to hold flat work. These arms are adjustable in the T slot 2ª and are held at adjustment by screws 2ᵇ. 3 indicates the centrally pivoted bar. 4 shows plugs or buttons which in my apparatus are preferably placed 5″ from the pivot and 10″ from each other. It will be noted the two buttons are placed near opposite ends of the bar. The numeral 5 indicates the pivot of the bar 3 which is free to turn in a vertical plane on this pivot, and means are provided for locking the bar in any position in this plane. The live center, equipped with adjustable spindle center plug, is indicated by 6. 7 shows a graduated circular disk attached to the sine bar 3. 8 indicates the main stem of the pivot arm. It will be seen that the cipher "0" is stamped on this piece to indicate the perfectly horizontal position of the sine bar or work surface or center. The graduated disk divisions passing the zero mark will facilitate of setting at any previously determined angle and by reading the angle direct work may be found to be in position. The center locking stem is shown by numeral 9. This piece is a forced fit in graduated disk 7 which in turn is forced in sine bar 3. 10 shows a knurled hand knob for tightening main stem 8 in position, said stem being vertically movable in a slot in the upright 15 supported on the surface plate. 11 is a similar hand knob for clamping the sine bar 3 in position at required or found angle, or horizontally. 12 represents a taper ground piece of work in position for testing. 13 is a fixed or dead center mounted on the bar 3. 16 indicates an internal gear fixed on the spindle 9, being part of a mechanism to provide easy means of minute accurate adjustment of the bar 3. It will be noted the bar 3, graduation disk 7 and internal gear 16 are fixed in relation to each other. 17 is a pinion arranged to mesh with the internal gear 16, and the rotation of this pinion causes the bar 3 to move or swing. 18 is a shaft connecting the pinion 17 to the thumbpiece 19 by which the pinion is turned.

In use, flat taper work is supported on the arms 2 or round taper work between the centers 6 and 13 and the inclined surface of the work is brought to parallelism with the surface plate by swinging the bar 3 on its pivot and the graduated disk 7 will indicate the angle in degrees. Then by measuring the distance between the surface plate and the buttons 4 the sine can be determined from the known angle and distances. Various ways of using the instrument will be apparent to those skilled in the art.

I claim:—

1. In a sine bar fixture, the combination of a surface plate, an angle indicating bar pivoted for movement in a plane perpendicular to the surface of said plate, and provided with means for supporting a piece of work, buttons on said bar, adjacent to opposite ends thereof, and angle indicating means carried by said bar.

2. In a sine bar fixture, the combination of a surface plate, a bar pivoted at its middle to swing in a plane perpendicular to the surface of said plate, angle indicating means carried by said bar at the pivot thereof, and means for supporting a piece of work at its opposite ends on said bar.

3. In a sine bar fixture, a pivoted bar provided with indicating means, and work holding means adjustable along said bar, said means comprising centers mounted on the bar to hold round work for rotation therebetween.

4. In a sine bar fixture, a pivoted bar provided with indicating means, and work holding means adjustable along said bar, said means comprising adjustable arms projecting laterally from the bar, at opposite sides of its pivot.

5. In a sine bar fixture, the combination of a surface plate, a bar pivoted to swing in a plane perpendicular to said plate and provided with indicating means, said bar being slotted along its edge, and work holding arms adjustably mounted in the slot.

6. In an instrument of the kind described, the combination of a tubular support, a stem rotatable in said support, a work holding bar on the stem, a gear fixed on the stem, and a pinion mounted to turn in the support and engaging said gear to turn the stem and swing the bar to desired position.

In testimony whereof, I affix my signature in presence of two witnesses.

CHRISTIAN LOEFFLER.

Witnesses:
 IDA HAGEN,
 HENRY F. FLINT.